Dec. 19, 1922.
M. A. SMITH.
BEET TOPPING DEVICE.
FILED OCT. 21, 1918.
1,439,026.
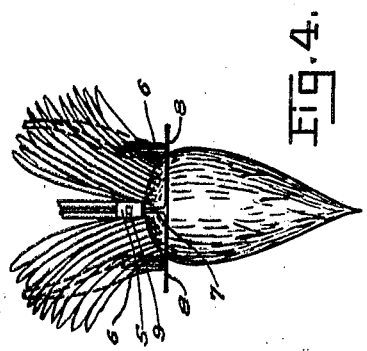
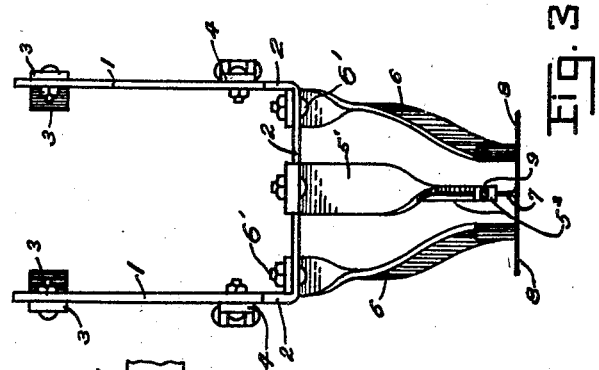
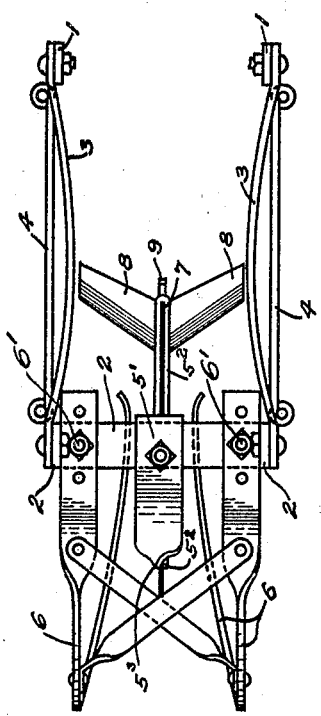
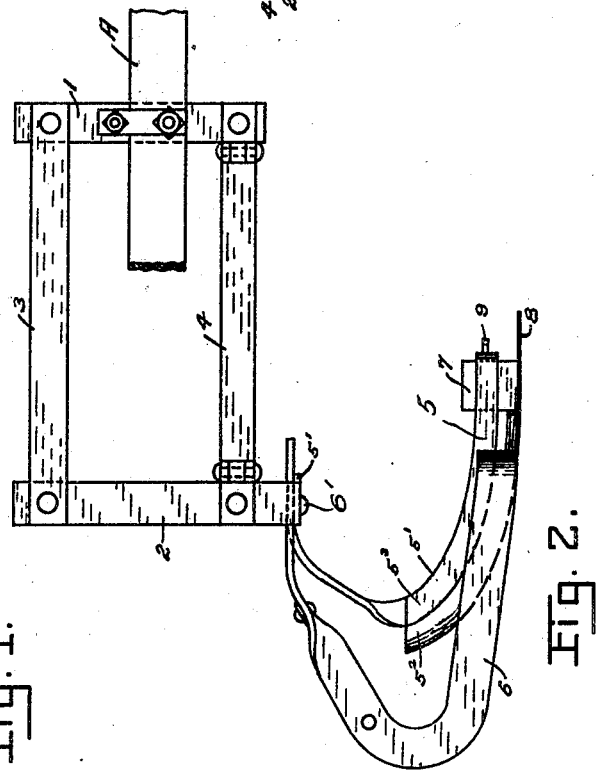
Marion A. Smith
INVENTOR
BY J. M. Thomas
ATTORNEY Patented Dec. 19, 1922.

1,439,026

UNITED STATES PATENT OFFICE.

MARION A. SMITH, OF SALT LAKE CITY, UTAH.

BEET-TOPPING DEVICE.

Application filed October 21, 1918. Serial No. 259,124.

*To all whom it may concern:*

Be it known that I, MARION A. SMITH, a citizen of the United States, residing at Salt Lake City, in the county of Salt Lake and State of Utah, have invented certain new and useful Improvements in Beet-Topping Devices, of which the following is a specification.

My invention relates to beet topping devices, and has for its object to provide a light serviceable device which may be attached to any beet digging machine and by which the beets may be topped while in the ground and the foliage cut from the body of the beets at the desired place regardless of whether the individual beet grew low or high in the ground with the further object of topping one or more rows of beets and regardless of whether the rows are at all places exactly parallel or that the beets may be found in a straight or crooked row.

These objects I accomplish with the device illustrated in the accompanying drawings in which similar letters and numerals of reference indicate like parts throughout the several figures and as described in the specification forming a part of this application and pointed out in the appended claims.

In the drawings in which I have shown a substantial embodiment of my invention, Figure 1 is a plan view of the device. Figure 2 is a side elevation of the same. Figure 3 is a rear elevation of the device, and Figure 4 is a diagrammatic view showing the relative position of the centering means, the topping knife and a beet just before it is topped. The present invention may be attached to the beams or other horizontal portions A of the digging machine by bolting the vertical bars 1 at their upper ends to said members A. A rectangular frame is provided by bolting said vertical bars 1 to a U-shaped member 2 by the horizontally placed curved springs 3 and the horizontal reaches 4. The front portion of said frame is carried on the runner 5 and centering springs 6, by bolting said runner and springs to the lower portion of said U-shaped member 2. The said runner 5 is made by bending and twisting a flat piece of spring material in order that one portion may form a flat contact with said U-shaped member, as at 5', and a foliage splitting knife, as at 5², with laterally projecting side flanges 5³; the purpose being to provide a vertical foliage splitting knife 5² with opposed side flanges 5³ which run on the ground and over the crown of the beets while the foliage splitting knife cuts a vertical slit in the foliage and through the crown of the beets as the device is drawn along and over the row of beets.

In order to center the cutting elements over each beet I provide, in addition to the said curved springs 3, two centering springs 6, which are made by bending and twisting pieces of flat spring material so that one portion of each may contact with and be secured to the said U-shaped member 2, as at 6', while another portion will project toward the rear and press each side of the individual beet as the device is drawn by and over the beet, the said centering springs 6 performing the double duty of raising the tips of the foliage so that it will pass over the rear ends of said springs and temporarily shifting the front portion of said frame, and of the U-shaped member 2 with the elements attached thereto to the right or left and bringing the topping knives in line with the crown of the individual beet, and as soon as one beet is topped to allow the centering elements to yieldingly adjust themselves to the next beet and again center the topping knives whether to the right or left as that beet will require. On the rear end portion of said runner 5 the topping knife is fastened, which knife consists of a vertical portion 7 and two laterally projecting wing blades 8.

I provide a vertical adjustment for said topping knife by slotting the rear portion of said runner 5 and the said vertical portion 7 is secured in said slot by means of a set screw 9.

The operation of my device is as follows:

With the device attached to the beams or other portions of a beet digging machine by bolting the vertical bars 1 to any horizontal portion of said digging machine and with said machine drawn along and over a row of matured beets and with my device preceding said digging means, the tips of the foliage of the beets will be raised by the centering springs 6 and the said springs will be pressed against the sides of the beets. The U-shaped member may be swung laterally especially at its lower portion and the foliage splitting knife will pass through the upper portion, or what is commonly called the crown of the beets. The depth to which the said knife will cut into said beet crown and body will be determined by the side flanges $5^3$, and as the said topping knife is fastened to the same U-shaped member 2, the topping knife will be drawn through and top the beet at the bottom of the cut through the crown made by the splitting blade $5^2$.

I thus provide new and novel means for centering the beets within the device, and new means of adjusting the topping knife to the particular beet as it is being topped.

Having described my invention and its operation I desire to secure by Letters Patent and claim:—

In a beet topping device the combination of a rectangularly shaped frame; curved springs forming the upper horizontal reaches of said frame to return said frame to normal position in front of and in line with a digging element; a flat spring with one end fastened to the lower portion of said frame and with a portion curved and twisted to form a foliage splitter and a runner slidable on the ground; integral side flanges on said runner portion to regulate the depth at which said foliage splitter will cut; a vertically adjustable crowsfoot knife detachably fastened on the rear end of said foliage splitter portion of said flat spring; and spring members secured to said frame and curved toward the rear and then outwardly and adapted to pass along opposite sides of growing beets to raise the ends of the foliage and center the foliage splitter over the crown of each beet as the device passes the beet in the ground.

In testimony whereof I have affixed my signature.

MARION A. SMITH.